United States Patent Office 3,072,589
Patented Jan. 8, 1963

3,072,589
AQUEOUS POLYMERIZATION OF FLUORINATED MONOMER IN THE PRESENCE OF HALOGENATED AROMATIC COMPOUNDS
Douglas A. Rausch and Harold G. Hahn, Midland, Mich., assignors to The Dow Chemical Company, Midland, Mich., a corporation of Delaware
No Drawing. Filed Feb. 4, 1960, Ser. No. 6,612
5 Claims. (Cl. 260—29.6)

This invention relates to an improved method for the preparation of latexes of polyfluoroolefins. More particularly, it relates to a method of producing such latexes which are characterized by a high degree of mechanical stability, small particle size, and high solids content.

The emulsion polymerization of completely halogenated fluoroolefins, such as tetrafluoroethylene and chlorotrifluoroethylene, is attended by certain difficulties, chief of which is the fact that the resulting latex is ordinarily extremely unstable. This is particularly true when an attempt is made to prepare a latex of high solids content. Accordingly, it is usually necessary to maintain the ratio of the continuous aqueous phase to the disperse phase at an impractically high value. Attempts to prepare latexes of suitably high solids content by the usual techniques employing conventional dispersing agents invariably result in the production of materials that coagulate with extreme ease, or at best, are pasty in consistency and of large particle size.

The difficulties encountered in the emulsion polymerization of fluoroolefins have been met, in part, by the use of highly fluorinated perhaloalkanoic acids as emulsifying agents. These materials, however, are difficult and expensive to prepare and their use does not permit the attaining of as high a solids content as is frequently desired.

It is, therefore, a principal object of the present invention to provide a method of emulsion copolymerization of mixtures of chlorotrifluoroethylene and vinylidene fluoride whereby a stable latex of desirably high solids content may be produced. An additional object is to provide a method of producing such a latex in the absence of a conventional emulsifying agent. A further object of the invention is to provide a method of producing such a latex in which the disperse phase is in the form of extremely small particles. Still another object is to provide a means of controlling the particle size of the described latex. Other and related objects will be evident from the description following.

According to the present invention, the above and related objects are attained by copolymerizing with the polymerizable mixture of fluoroolefins, relatively small but effective amounts of methyl acrylate and of 2-sodiosulfoethyl acrylate and conducting the emulsion polymerization in the presence of certain readily available aryl halides and substituted aryl halides. Specifically, the aryl halides are dichlorobenzene compounds, either orthodichlorobenzene or 2,5-dichlorobenzotrifluoride. The use of these materials in the preparation of latexes of fluoroolefin polymers is described in a copending application, Serial No. 6,613, of Douglas A. Rausch, filed on February 4, 1960.

In the preferred embodiment of the invention, the polymerization is carried out in the presence of the dichlorobenzene compound, as defined, together with the methyl acrylate and 2-sodiosulfoethyl acrylate and in the absence of a conventional emulsifying agent.

The method of the present invention is particularly useful in the preparation of latexes of copolymers of chlorotrifluoroethylene with vinylidene fluoride. The method provides a means of obtaining latexes free of the extractable residues found in latexes prepared with conventional emulsifying or dispersing agent. It further provides a means of controlling the particle size of the latexes so obtained.

In the practice of the invention no significant departure from the usual procedures of emulsion polymerization is required. The methyl acrylate, the 2-sodiosulfoethyl acrylate and the dichlorobenzene compound are merely added to the mixture of water, monomer charge and catalyst before emulsification and polymerization are carried out in the known manner. The catalyst employed is preferably a water soluble peroxy compound, exemplified by ammonium persulfate, potassium persulfate, sodium persulfate, sodium perborate, or hydrogen peroxide.

Advantageously, the dichlorobenzene compounds may be employed in an amount equal from about 1 percent by weight to about 10 percent, based on the total weight of the monomeric material, which includes the methyl acrylate and the 2-sodiosulfoethyl acrylate as well as the fluoroolefins. The amount to be employed is a matter of choice, inasmuch as it has been determined that control of particle size may be obtained by regulating the amount of this component. That is, the particle size of the latex obtained increases with decreasing content of the dichlorobenzene compound.

The methyl acrylate and the 2-sodiosulfoethyl acrylate taken together will generally constitute from about 10 percent to about 20 percent of the total weight of the mixture of monomers, that is, the mixture of these materials with the fluoroolefin monomers. The 2-sodiosulfoethyl acrylate itself normally will represent about at least 8.5 percent of the said total weight and it may be employed in an amount equal to about 15 percent. The methyl acrylate is normally used in relatively smaller amount. Thus, it may represent from about 1.5 percent to about 5.0 percent of the above mentioned total weight. The preferred range of methyl acrylate content is from about 2 percent to about 4 percent of the total weight of polymerizable material.

The fluoroolefin portion of the polymerizable material is, of course, the major component of the mixture, comprising from about 80 percent to about 90 percent of the total weight. It may consist solely of chlorodifluoroethylene or it may be a mixture of this compound with vinylidene fluoride. The relative amounts of chlorodifluoroethylene and of vinylidene fluoride to be employed is a matter of choice, it being evident to those skilled in the art that wide variations in the properties of the polymers produced may be obtained by varying the relative amounts of the fluoroolefins.

The invention is illustrated by the following examples which are intended to be merely demonstrative and not limiting and wherein all parts and percentages are on a weight basis.

EXAMPLE 1

A solution containing 150 parts of oxygen-free distilled water, 0.75 part of sodium bisulfite, 0.075 part of ferrous sulfate heptahydrate and 9.0 parts of 2-sodiosulfoethyl acrylate was prepared and adjusted to a pH of 3.0. This solution, together with 9.0 parts of 2,5-dichlorobenzotrifluoride and 2.7 parts of methyl acrylate, was charged into a stainless steel pressure vessel. The contents of the vessel were frozen and the vessel was evacuated. A solution of 2.25 parts of potassium persulfate in 30 parts of water was then introduced into the vessel. The contents of the vessel were refrozen. After reevacuation of the vessel, 79.5 parts of chlorotrifluoroethylene and 9.0 parts of vinylidene chloride were charged into it by distillation. The vessel was then sealed and placed in a water bath maintained at 20° C. where it was subjected to agitation for 20 hours. There was formed a stable, fluid latex having a solids content of 40 percent and having an average particle size of about 1,800 A.

EXAMPLE 2

The experiment described in Example 1 was repeated with the methyl acrylate omitted from the formulation. No latex was obtained; the polymer separated as a completely coagulated mass.

EXAMPLE 3

The experiment described in Example 1 was repeated with 9.0 parts of orthodichlorobenzene replacing the 2,5-dichlorobenzotrifluoride. A latex was obtained comparable to that of Example 1 in regard to particle size and stability.

EXAMPLE 4

The experiment described in Example 1 was repeated except for the fact that only 2.0 parts of 2,5-dichlorobenzotrifluoride were employed. A stable, fluid latex was obtained.

EXAMPLE 5

The experiment described in Example 1 was repeated, except that the mixture of fluoroolefins was replaced by 88.5 parts of chlorotrifluoroethylene alone. A stable, fluid latex was obtained.

EXAMPLE 6

Following the procedure of Example 1 and employing the amounts of the nonpolymerizable components shown therein, latexes were prepared from a number of mixtures of the polymerizable materials. The results are set out in Table I.

Table I

| Run No. | 1 | 2 | 3 | 4 | 5 |
|---|---|---|---|---|---|
| Chlorotrifluoroethylene, parts | 76.6 | 77.6 | 64.2 | 79.5 | 83.0 |
| Vinylidene fluoride, parts | 9.7 | 11.1 | 18.3 | 9.3 | 5.1 |
| 2-sodiosulfoethyl acrylate, parts | 11.7 | 8.4 | 13.4 | 8.6 | 9.8 |
| Methyl acrylate, parts | 1.9 | 2.8 | 4.1 | 2.6 | 3.0 |
| Latex solids, percent | 34.0 | 41.0 | 30.0 | 40.0 | 40.0 |
| Average particle size, Angstroms | 2,000 | 1,780 | 1,480 | 1,800 | 1,800 |

What is claimed is:

1. A process for preparing latexes of fluorinated polymers comprising emulsifying in an aqueous medium (A) a polymerizable monomeric material selected from the group consisting of chlorotrifluoroethylene and admixtures thereof with lesser amounts of vinylidene fluoride together with (B) a relatively small amount of a monomer mixture consisting essentially of 2-sodiosulfoethyl acrylate and methyl acrylate and (C) from about 1 percent to about 10 percent by weight, based on the total initial weight of (A) plus (B), of a dichlorobenzene compound selected from the group consisting of orthodichlorobenzene and 2,5-dichlorobenzotrifluoride, and maintaining the emulsion until substantially complete polymerization occurs.

2. A process for preparing latexes of fluorinated polymers comprising emulsifying in an aqueous medium a polymerizable monomeric mixture containing (D) from about 1.5 percent to about 5 percent of methyl acrylate, (E) from about 8 percent to about 15 percent of 2-sodiosulfoethyl acrylate, the balance of said polymerizable monomeric mixture being (F) a mixture of chlorotrifluoroethylene and a lesser amount of vinylidene fluoride relative thereto and (G) from about 1 percent to about 10 percent by weight, based on the total weight of (D), (E) and (F), of a dichlorobenzene compound selected from the group consisting of orthodichlorobenzene and 2,5-dichlorobenzotrifluoride.

3. A process for preparing latexes of fluorinated polymers comprising emulsifying in an aqueous medium a polymerizable monomeric mixture containing (D) from about 1.5 percent to about 5 percent of methyl acrylate, (E) from about 8 percent to about 15 percent of 2-sodiosulfoethyl acrylate, the balance of said polymerizable monomeric mixture being (F) chlorotrifluoroethylene and (G) from about 1 percent to about 10 percent by weight, based on the total weight of (D), (E) and (F), of a dichlorobenzene compound selected from the group consisting of orthodichlorobenzene and 2,5-dichlorobenzotrifluoride.

4. A process according to claim 1 wherein the methyl acrylate and 2-sodiosulfoethyl acrylate taken together constitute from about 10 percent to about 20 percent by weight of the total weight of polymerizable material.

5. A process according to claim 4 wherein methyl acrylate constitutes at least 1.5 percent by weight of the total weight of polymerizable material and 2-sodiosulfoethyl acrylate constitutes at least 8.5 percent of said total weight.

References Cited in the file of this patent
UNITED STATES PATENTS

| 2,559,752 | Berry | July 10, 1951 |
| 2,662,065 | Berry | Dec. 3, 1953 |
| 2,816,082 | Brinker et al. | Dec. 10, 1957 |
| 2,914,499 | Sheetz | Nov. 24, 1959 |
| 2,965,595 | Brinker et al. | Dec. 20, 1960 |

OTHER REFERENCES

Booth et al.: J.A.C.S., volume 57, 1935, pages 2066–9.